(12) United States Patent
Kesek et al.

(10) Patent No.: US 11,788,413 B2
(45) Date of Patent: Oct. 17, 2023

(54) GAS TURBINE ENGINE SHAFT WITH LOBED SUPPORT STRUCTURE

(71) Applicant: Pratt & Whitney Canada Corp., Longueuil (CA)

(72) Inventors: Mateusz Kesek, Debica (PL); Wojciech Durak, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/470,161

(22) Filed: Sep. 9, 2021

(65) Prior Publication Data
US 2023/0077144 A1 Mar. 9, 2023

(51) Int. Cl.
*F01D 5/02* (2006.01)
*F02C 6/20* (2006.01)
*F02C 7/06* (2006.01)
*F02C 7/36* (2006.01)
*F16D 1/076* (2006.01)

(52) U.S. Cl.
CPC ............. *F01D 5/025* (2013.01); *F01D 5/026* (2013.01); *F02C 6/206* (2013.01); *F02C 7/06* (2013.01); *F02C 7/36* (2013.01); *F16D 1/076* (2013.01); *F05D 2220/325* (2013.01); *F05D 2240/61* (2013.01)

(58) Field of Classification Search
CPC .......... F01D 5/026; F01D 5/066; F01D 5/025; F02C 7/36; F02C 6/206; F05D 2220/325; F05D 2250/181–185; F05D 2240/60–61; F16D 1/076; Y10T 403/27; Y10T 403/642; Y10T 403/645
See application file for complete search history.

(56) References Cited

U.S. PATENT DOCUMENTS 2,427,614 A * 9/1947 Meier ................. F16D 1/076
416/244 R
2,939,536 A 6/1960 Kearns, Jr.
4,162,860 A 7/1979 Mengeringhausen
(Continued)

FOREIGN PATENT DOCUMENTS

EP 2006554 A2 12/2008
EP 2882962 B1 10/2016

OTHER PUBLICATIONS

EP search report for EP22194671.8 dated Jun. 12, 2023.

*Primary Examiner* — Brian P Wolcott
*Assistant Examiner* — Jesse M Prager
(74) *Attorney, Agent, or Firm* — Getz Balich LLC

(57) ABSTRACT

An apparatus for a gas turbine engine includes a shaft base, a flange and a plurality of lobes. The shaft base extends axially along an axis between a shaft first end and a shaft second end. The flange is connected to the shaft base at the shaft first end. The flange projects radially out from the shaft base. The flange includes a plurality of fastener apertures, and the fastener apertures include a first fastener aperture. The lobes are arranged circumferentially about the axis. Each of the lobes is connected to and projects radially away from the shaft base. Each of the lobes is connected to and projects axially out from the flange. The lobes include a first lobe and a second lobe. The first fastener aperture is arranged circumferentially between the first lobe and the second lobe. The second lobe radially overlaps the first fastener aperture.

16 Claims, 6 Drawing Sheets

(56) References Cited

U.S. PATENT DOCUMENTS

| | | | | |
|---|---|---|---|---|
| 4,749,288 | A * | 6/1988 | Tilch | F16C 19/386 |
| | | | | 384/585 |
| 5,095,773 | A * | 3/1992 | Okuzumi | F16H 57/028 |
| | | | | 74/606 R |
| 5,718,460 | A * | 2/1998 | Glunt | F16L 55/00 |
| | | | | 138/44 |
| 10,443,448 | B2 * | 10/2019 | Becoulet | F01D 25/243 |
| 10,465,611 | B2 * | 11/2019 | Durocher | F02C 3/10 |
| 2011/0274541 | A1 | 11/2011 | Belmonte | |
| 2017/0108009 | A1 | 4/2017 | Obereich | |
| 2018/0245480 | A1 | 8/2018 | Becoulet | |

* cited by examiner

GAS TURBINE ENGINE SHAFT WITH LOBED SUPPORT STRUCTURE

TECHNICAL FIELD

This disclosure relates generally to a gas turbine engine and, more particularly, to a shaft for the gas turbine engine.

BACKGROUND INFORMATION

A gas turbine engine may include a shaft with a flange for mounting to another component. To reduce stress concentrations at an interface between a tubular base of the shaft and the flange, a fillet may be provided. While such a shaft configuration has various benefits, there is still room in the art for improvement.

SUMMARY

According to an aspect of the present disclosure, an apparatus is provided for a gas turbine engine. This gas turbine engine apparatus includes a shaft base, a flange and a plurality of lobes. The shaft base extends axially along an axis between a shaft first end and a shaft second end. The flange is connected to the shaft base at the shaft first end. The flange projects radially out from the shaft base. The flange includes a plurality of fastener apertures, and the fastener apertures include a first fastener aperture. The lobes are arranged circumferentially about the axis. Each of the lobes is connected to and projects radially away from the shaft base. Each of the lobes is connected to and projects axially out from the flange. The lobes include a first lobe and a second lobe. The first fastener aperture is arranged circumferentially between the first lobe and the second lobe. The second lobe radially overlaps the first fastener aperture.

According to another aspect of the present disclosure, another apparatus is provided for a gas turbine engine. This gas turbine engine apparatus includes a shaft base, a flange and a flange support structure. The shaft base extends axially along an axis. The flange is connected to and projects radially out from the shaft base. The flange support structure is connected to and is between the shaft base and the flange. The flange support structure radially tapers towards the shaft base as the flange support structure projects axially away from the flange. The flange support structure includes an outer peripheral boundary at the flange when viewed in a plane perpendicular to the axis. The outer peripheral boundary includes a plurality of concave sections and a plurality of convex sections interspersed with the concave sections.

According to still another aspect of the present disclosure, another apparatus is provided for a gas turbine engine. This gas turbine engine apparatus includes a shaft base, a flange and a flange support structure. The shaft base extends axially along an axis. The flange is connected to and projects radially out from the shaft base. The flange includes a plurality of fastener apertures. The flange support structure is connected to and is between the shaft base and the flange. The flange support structure projects radially out from a cylindrical surface of the shaft base. The flange support structure includes a plurality of grooves arranged circumferentially about the axis. Each of the fastener apertures radially and circumferentially overlaps a respective one of the grooves.

The flange support structure may include a plurality of lobes arranged circumferentially about the axis. A first of the lobes may project radially away from the shaft base to a first of the convex sections.

The flange support structure may form a plurality of grooves arranged circumferentially about the axis. A first of the grooves may project radially into the flange support structure to a first of the concave sections.

The flange may include a plurality of fastener apertures. A first of the fastener apertures may be arranged circumferentially between a circumferentially neighboring pair of the convex sections.

The shaft base may be configured as a tubular shaft base.

The first fastener aperture may extend axially through the flange.

The first lobe may radially overlap the first fastener aperture.

The lobes may also include a third lobe. The fastener apertures may also include a second fastener aperture arranged circumferentially between the second lobe and the third lobe.

The second lobe may radially overlap the second fastener aperture.

The lobes may also include a third lobe and a fourth lobe. The fastener apertures may also include a second fastener aperture arranged circumferentially between the third lobe and the fourth lobe. The third lobe may radially overlap the second fastener aperture.

The first lobe may circumferentially taper as the first lobe projects radially away from the shaft base towards a distal end of the first lobe.

The first lobe may axially taper as the first lobe projects radially away from the shaft base towards a distal end of the first lobe.

The apparatus may also include a fillet at a corner between the first lobe and the flange.

The apparatus may also include a flange support structure projecting radially out from a cylindrical outer surface of the shaft base. The flange support structure may include the lobes.

Tips of the lobes may define an outer peripheral circumference of the flange support structure. A diameter of the outer peripheral circumference of the flange support structure may be between 1.05 times and two times a diameter of the cylindrical outer surface.

A convex portion of the flange support structure at a tip of the first lobe may have a first radius of curvature. A concave portion of the flange support structure between the first lobe and the second lobe may have a second radius of curvature. A ratio of the first radius of curvature to the second radius of curvature may be between 0.2 and 2.5.

The apparatus may also include a plurality of fasteners and a rotor for the gas turbine engine. The fasteners may be mated with the fastener apertures. The rotor may be mounted to the flange by the fasteners.

The rotor may be configured as or otherwise include a propeller. The gas turbine engine may be configured as or otherwise include a turboprop engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
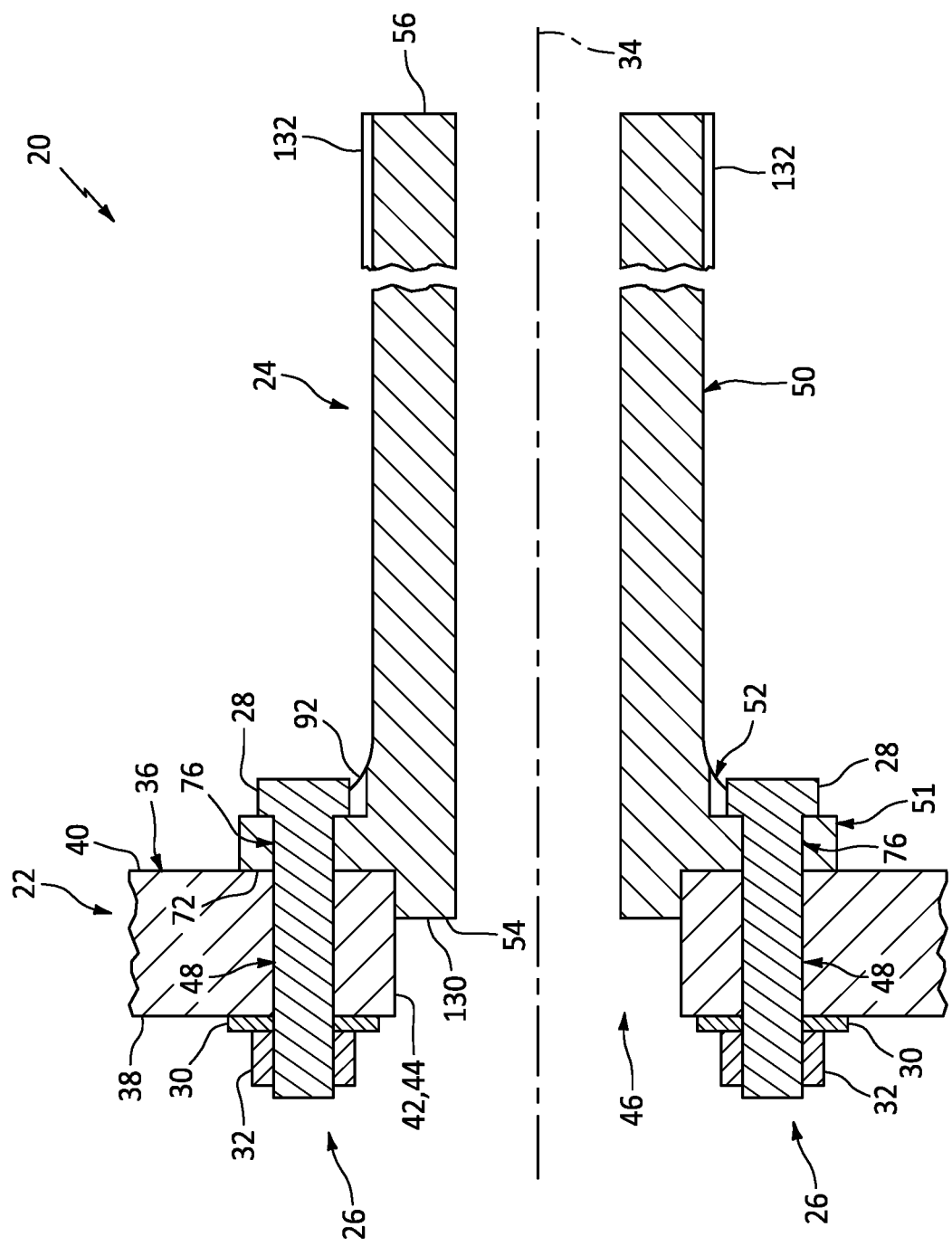
FIG. 1 is a side sectional illustration of a portion of a rotating structure.

FIG. 1 illustrates a portion of a rotating structure 20 for a gas turbine engine. This gas turbine engine may be configured as a gas turbine engine for an aircraft propulsion system, an exemplary embodiment of which is described below in further detail (e.g., see FIG. 7). However, the rotating structure 20 of the present disclosure is not limited to such an aircraft propulsion system application. The rotating structure 20, for example, may alternatively be configured with a gas turbine engine such as an auxiliary power unit (APU) for an aircraft or other vehicle, or an industrial gas turbine engine.

The rotating structure 20 of FIG. 1 includes a rotating structure rotor 22 and a rotating structure shaft 24. The rotating structure 20 of FIG. 1 also includes one or more fasteners 26 for mounting the rotor 22 to the shaft 24. Each fastener 26 of FIG. 1 includes a bolt 28, a washer 30 and a nut 32. The present disclosure, however, is not limited to such an exemplary fastener arrangement. For example, in other embodiments, each fastener 26 may include a stud, a washer and a nut. In still other embodiments, the washers 30 may be omitted.

The rotor 22 of FIG. 1 is configured to rotate about a rotational axis 34, which rotational axis 34 may also be an axial centerline of the gas turbine engine. This rotor 22 includes a rotor hub 36. The rotor 22 may also include a plurality of blades (not shown in FIG. 1) arranged circumferentially about and connected to the rotor hub 36. The rotor 22, for example, may be configured as a propeller for a turboprop engine. The present disclosure, however, is not limited to such an exemplary rotor configuration. The rotor 22, for example, may alternatively be configured as a fan rotor for a turbofan engine, a compressor rotor for a gas turbine engine, or a turbine rotor for a gas turbine engine. In still other embodiments, the rotor 22 may be configured as a gear, a hub for another shaft, or any other gas turbine engine component which may be coupled to a shaft as described below.

The rotor hub 36 extends axially along the rotational axis 34 between and to a first side 38 of the rotor hub 36 and a second side 40 of the rotor hub 36. The rotor hub 36 of FIG. 1 extends radially inward (towards the rotational axis 34) to an inner end 42 of the rotor hub 36. An (e.g., cylindrical) inner surface 44 at the hub inner end 42 forms a bore 46 in the rotor hub 36. The hub bore 46 of FIG. 1 extends axially through the rotor hub 36 between and to the hub first side 38 and the hub second side 40; e.g., the hub bore 46 is configured as a through-hole. However, in other embodiments, the hub bore 46 may extend partially axially into the rotor hub 36 from the hub second side 40; e.g., the hub bore 46 may be configured as a blind-hole.

The rotor hub 36 includes a plurality of fastener apertures 48; e.g., bolt holes. These hub fastener apertures 48 are arranged circumferentially about the rotational axis 34 and the hub bore 46 in an annular array. Each of the hub fastener apertures 48 extends axially through the rotor hub 36 between and to the hub first side 38 and the hub second side 40.

The shaft 24 of FIG. 1 is configured to rotate about the rotational axis 34. This shaft 24 includes a shaft base 50, a shaft flange 51 and a flange support structure 52.

Figure 2:
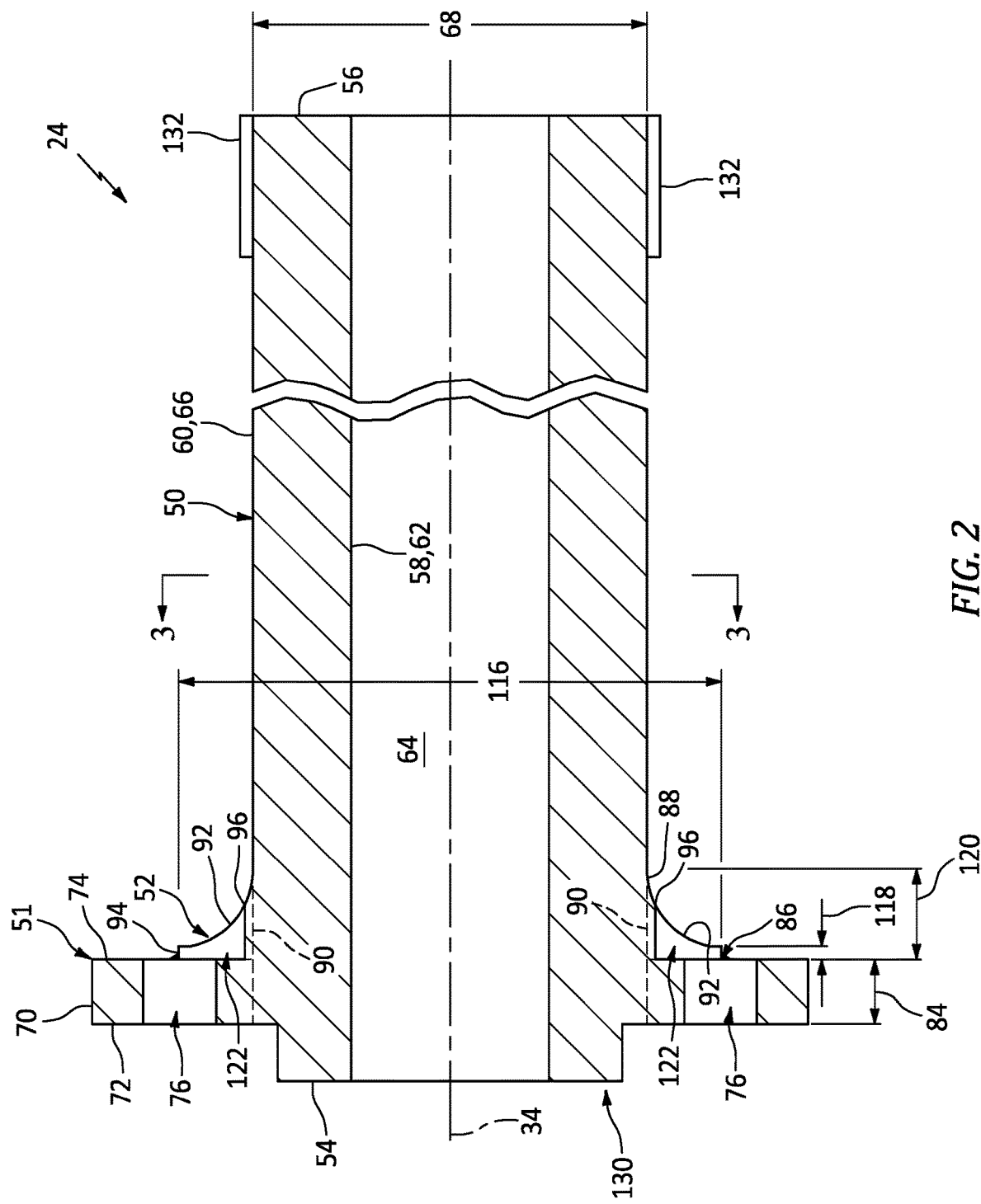
FIG. 2 is a side sectional illustration of a shaft for the rotating structure.

Referring to FIG. 2, the shaft base 50 extends axially along the rotational axis 34 between and to a first end 54 of shaft base 50 (e.g., a first end of the shaft 24) and a second end 56 of the shaft base 50 (e.g., a first end of the shaft 24). The shaft base 50 extends circumferentially about (e.g., completely around) the rotational axis 34, thereby providing the shaft base 50 is a full-hoop (e.g., tubular) body. The shaft base 50 extends radially between and to an inner side 58 of the shaft base 50 (e.g., an inner side of the shaft 24) and an outer side 60 of the shaft base 50.

A (e.g., cylindrical) inner surface 62 of the shaft base 50 at the base inner side 58 at least partially or completely forms a shaft bore 64 in the shaft 24. This shaft bore 64 of FIG. 2 extends axially through the shaft 24 and its shaft base 50 between and to the base first end 54 and the base second end 56. However, in other embodiments, the shaft bore 64 may extend axially within or into the shaft base 50. In still other embodiments, the shaft 24 may be configured as a solid shaft where the shaft bore 64 is omitted.

The shaft base 50 of FIG. 2 includes a (e.g., cylindrical) outer surface 66 at the base outer side 60. This base outer surface 66 has an outer surface diameter 68.

The shaft flange 51 is connected to (e.g., formed integral with or otherwise attached to) the shaft base 50 at (e.g., on, adjacent or proximate) the base first end 54. The shaft flange 51 extends circumferentially about (e.g., completely around) the rotational axis 34 and the shaft base 50, thereby providing the shaft flange 51 with a full-hoop (e.g., annular) body. The shaft flange 51 projects radially out from the shaft base 50 to a distal outer end 70 of the shaft flange 51, where the shaft flange 51 of FIG. 1 is perpendicular to the rotational axis 34. The shaft flange 51 extends axially along the rotational axis 34 between and to a first side 72 of the shaft flange 51 and a second side 74 of the shaft flange 51. The flange first side 72 of FIG. 2 is (e.g., slightly) axially recessed from the base first end 54. However, in other embodiments, the flange first side 72 may be configured flush with the base first end 54, or otherwise.

Figure 3:
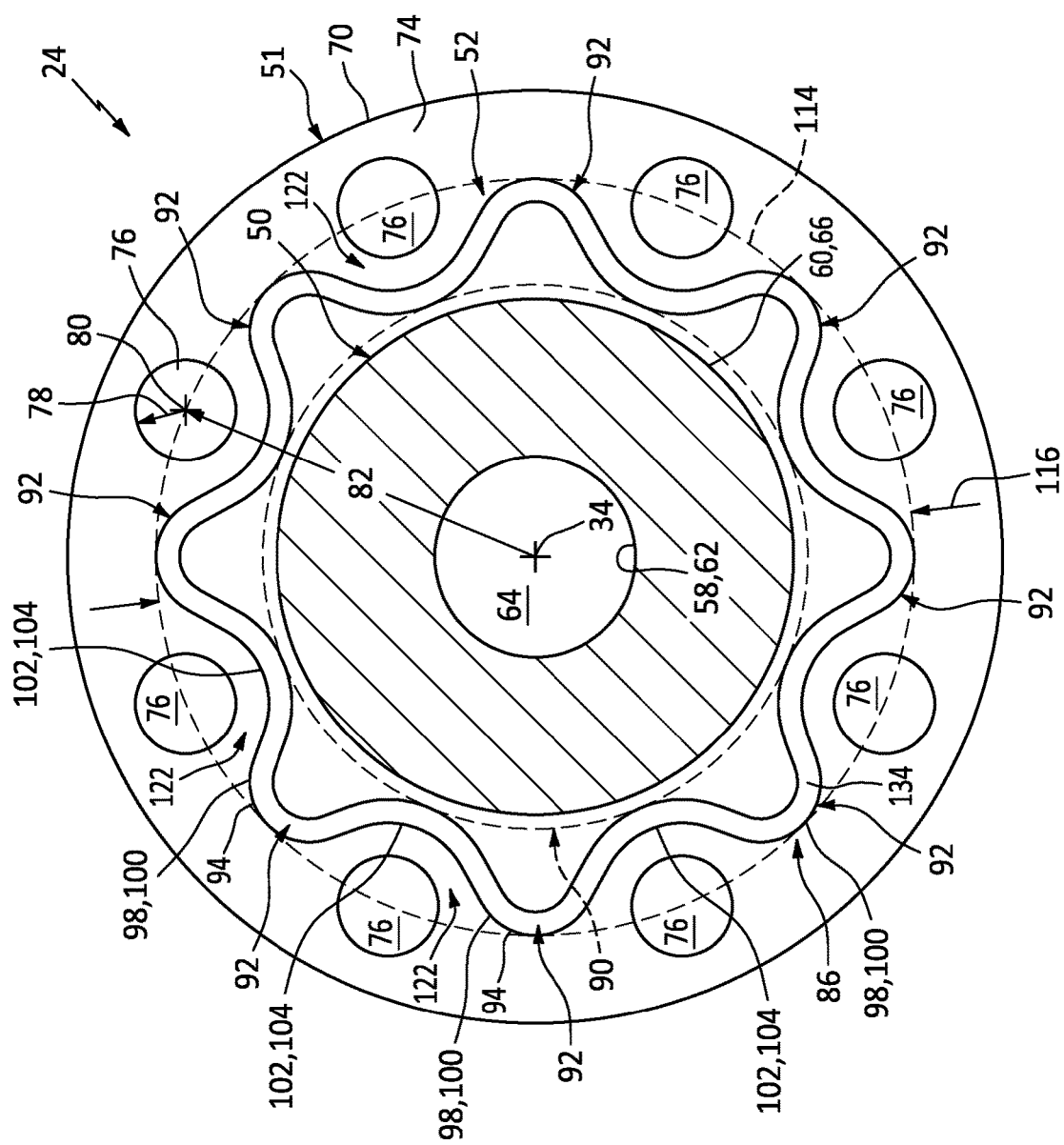
FIG. 3 is a cross-sectional illustration of the shaft taken along line 3-3 in FIG. 2.

Referring to FIG. 3, the shaft flange 51 includes a plurality of fastener apertures 76; e.g., bolt holes. These flange fastener apertures 76 are arranged circumferentially about the rotational axis 34 and the shaft base 50 in an annular array. Each of the flange fastener apertures 76 extends axially through the shaft flange 51 between and to the flange first side 72 and the flange second side 74; see also FIG. 2. Each of the flange fastener apertures 76 of FIG. 3 has a circular cross-sectional geometry when viewed, for example, in a plane perpendicular to the rotational axis 34 and/or a plane perpendicular to a centerline 80 of the respective aperture 76; e.g., plane of FIG. 3.

Each of the flange fastener apertures 76 has a fastener aperture radius 78. The centerline 80 of each of the flange fastener apertures 76 is disposed a radial distance 82 from the rotational axis 34.

The shaft flange 51 of FIG. 2 has a flange width 84. This flange width 84 is an axial distance measured between the flange first side 72 and the flange second side 74.

The support structure 52 is configured to structurally reinforce the shaft flange 51, and further structurally tie the shaft flange 51 to the shaft base 50. The support structure 52 of FIGS. 2 and 3, for example, is connected to (e.g., formed integral with or otherwise attached to) and disposed (e.g., at a corner) between the shaft base 50 and the shaft flange 51.

The support structure 52 of FIG. 3 extends circumferentially about (e.g., completely around) the shaft base 50, thereby providing the support structure 52 with a lobed (e.g., spoked) full-hoop (e.g., annular) body. Referring to FIG. 2, the support structure 52 projects radially out from the shaft base 50 and its outer surface 66, along the shaft flange 51 and its flange second side 74, to an outer peripheral boundary 86 of the support structure 52. The support structure 52 projects axially out from the shaft flange 51, along the shaft base 50 and its outer side 60, to an axial distal end 88 of the support structure 52.

The support structure 52 of FIG. 3 includes a support structure base 90 and one or more support structure lobes 92. The support structure base 90 is abutted radially against and connected to (e.g., formed integral with or otherwise attached to) the shaft base 50 at its base outer side 60. The support structure base 90 of FIG. 2 is abutted axially against and connected to (e.g., formed integral with or otherwise attached to) the shaft flange 51 at its flange second side 74. The support structure base 90 of FIG. 3 extends circumferentially about (e.g., completely around) the rotational axis 34, thereby providing the support structure base 90 with a full-hoop (e.g., annular) body.

The support structure lobes 92 are arranged circumferentially about the rotational axis 34, the shaft base 50 and the support structure base 90 in an annular array. Each of the support structure lobes 92 is abutted radially against and connected to (e.g., formed integral with or otherwise attached to) the support structure base 90. Each of the support structure lobes 92 of FIG. 2 is abutted axially against and connected to (e.g., formed integral with or otherwise attached to) the shaft flange 51 at its flange second side 74.

Each of the support structure lobes 92 projects radially out from the support structure base 90, radially away from the shaft base 50 and along the shaft flange 51 and its flange second side 74, to a distal outer end 94 (e.g., tip) of the respective support structure lobe 92. Each of the support structure lobes 92 projects axially out from the shaft flange 51 and its flange second side 74, along the shaft base 50 and its base outer side 60, to a distal axial end 96 of the respective support structure lobe 92.

Each of the support structure lobes 92 may axially taper as the respective support structure lobe 92 projects radially out from the support structure base 90 (radially away from the shaft base 50) towards or to its respective distal outer end 94. Referring to FIG. 3, each of the support structure lobes 92 may also or alternatively circumferentially taper as the respective support structure lobe 92 projects radially out from the support structure base 90 (radially away from the shaft base 50) towards or to its respective distal outer end 94.

The support structure lobes 92 provide the support structure 52 with a lobed configuration; e.g., a castellated, a spoked and/or a gear-like configuration. The support structure lobes 92 of FIG. 3, for example, provide the outer peripheral boundary 86 of the support structure 52 with a lobed (e.g., ribbed, wavy, etc.) cross-sectional geometry when viewed, for example, in a plane perpendicular to the rotational axis 34. For example, a convex portion 98 of the support structure 52 formed by a respective one of the support structure lobes 92 at its distal outer end 94 (e.g., tip) provides the outer peripheral boundary 86 with one of a plurality of convex sections 100. A concave portion 102 of the support structure 52 formed by trough between a circumferentially neighboring (e.g., adjacent) pair of the support structure lobes 92 provides the outer peripheral boundary 86 with one of a plurality of concave sections 104. The concave portions 102 are interspersed with the convex portions 98 circumferentially about the rotational axis 34, and the concave sections 104 are interspersed with the convex sections 100 circumferentially about the rotational axis 34.

Figure 4:
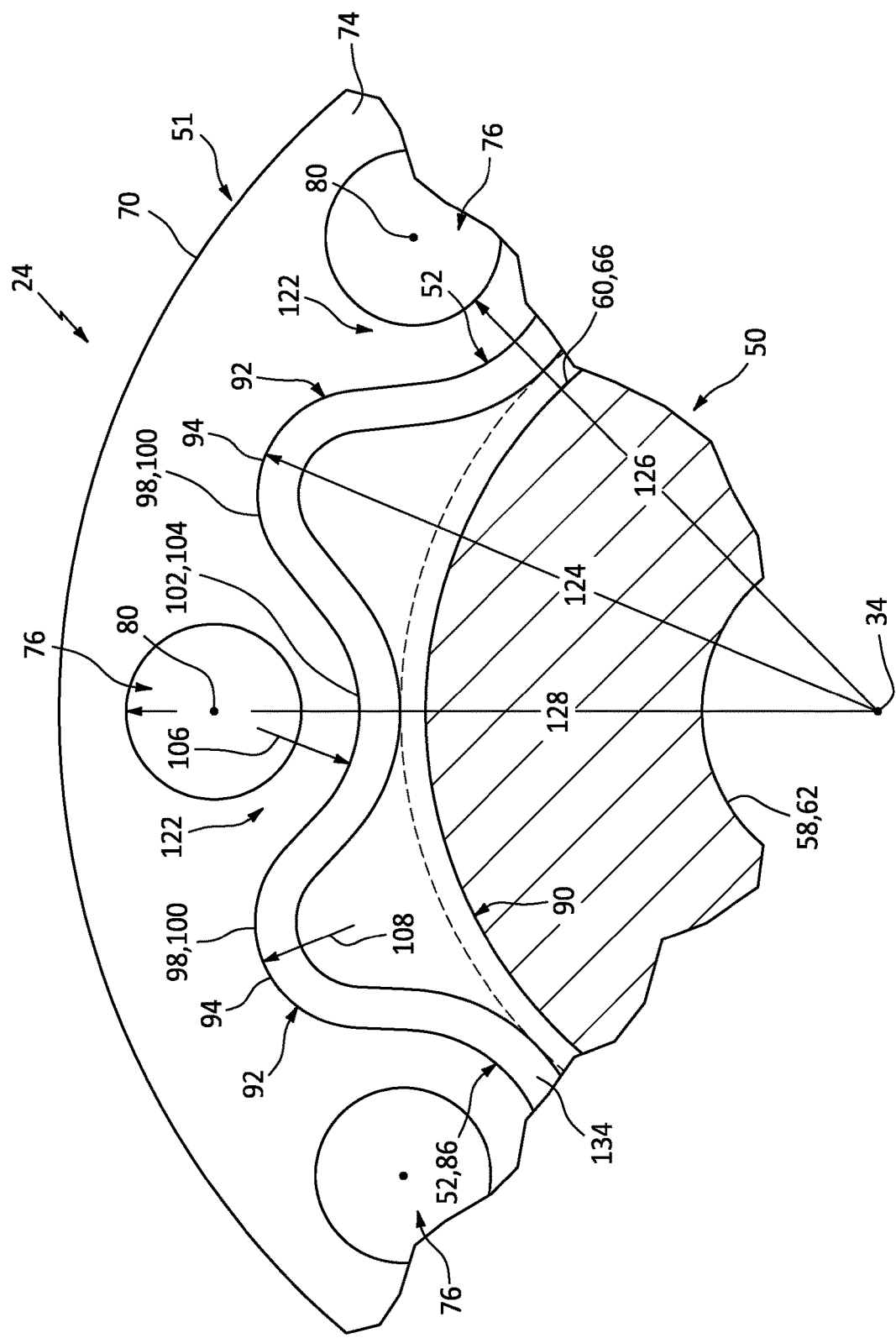
FIG. 4 is an enlarged cross-sectional illustration of a portion of the shaft in FIG. 3.

Referring to FIG. 4, each of the concave portions 102/concave sections 104 may have an arcuate geometry. This arcuate geometry may be a partially circular geometry, a partially oval geometry, a splined geometry, or otherwise. Each concave portion 102/concave section 104 has a concave radius of curvature 106 when viewed, for example, in a plane perpendicular to the rotational axis 34. This concave radius of curvature 106 may be constant along a portion or an entirety of the concave portion 102/the concave section 104 where that element 102, 104 has a partially circular geometry. The concave radius of curvature 106 may be (e.g., continuously or intermittently) variable along a portion or an entirety of the concave portion 102/the concave section 104 where that element 102, 104 has a partially oval geometry, a splined geometry, or otherwise.

Each of the convex portions 98/convex sections 100 may have an arcuate geometry. This arcuate geometry may be a partially circular geometry, a partially oval geometry, a splined geometry, or otherwise. Each convex portion 98/convex section 100 has a convex radius of curvature 108 when viewed, for example, in a plane perpendicular to the rotational axis 34. This convex radius of curvature 108 may be constant along a portion or an entirety of the convex portion 98/the convex section 100 where that element 98, 100 has a partially circular geometry. The convex radius of curvature 108 may be (e.g., continuously or intermittently) variable along a portion or an entirety of the convex portion 98/the convex section 100 where that element 98, 100 has a partially oval geometry, a splined geometry, or otherwise.

A ratio between the convex radius of curvature 108 and the concave radius of curvature 106 may be between 0.2 and 2.5. The ratio, for example, may be between 0.2 and 0.5, or between 0.5 and 1.0, or between 1.0 and 2.0, or between 2.0 and 2.5. The present disclosure, however, is not limited to the foregoing exemplary dimensional relationships.

Figure 5:
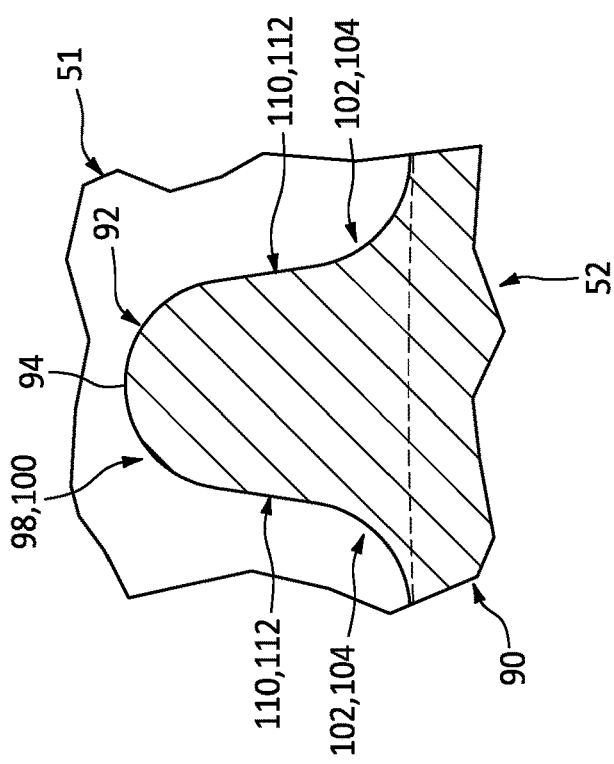
FIG. 5 is a cross-sectional illustration of a portion of the shaft configured with another support structure lobe.

Each convex portion 98/convex section 100 of FIG. 4 extends between and to a circumferentially adjacent pair of the concave portions 102/concave sections 104. Similarly, each concave portion 102/concave section 104 of FIG. 4 extends between and to a circumferentially adjacent pair of the convex portions 98/convex sections 100. In other embodiments however, referring to FIG. 5, at least one (or each) of the concave portions 102/concave sections 104 may be separated from a circumferentially adjacent one of the convex portions 98/convex sections 100 by an intermediate portion 110/intermediate section 112. The intermediate portion 110/the intermediate section 112 of FIG. 5 has a straight geometry; however, the present disclosure is not limited thereto.

Referring to FIG. 3, the support structure 52 has an outer peripheral circumference 114. This outer peripheral circumference 114 of FIG. 3 is defined by the support structure lobes 92 at their distal outer ends 94; e.g., tips. The outer peripheral circumference 114 has a support structure diameter 116. Referring to FIG. 2, this support structure diameter 116 may be sized between 1.05 times and 2 times the outer surface diameter 68. The support structure diameter 116, for example, may be between 1.05 times and 1.5 times or between 1.5 times and 2 times the outer surface diameter 68. The present disclosure, however, is not limited to the foregoing exemplary dimensional relationships.

The support structure 52 and its lobes 92 have an axial width 118 at the distal outer ends 94; e.g., tips. This axial width 118 is sized different (e.g., less) than the flange width 84. An axial width 120 of the support structure 52 at the shaft base 50 may also be sized different (e.g., greater or less) or equal to the flange width 84. The present disclosure, however, is not limited to the foregoing exemplary dimensional relationships.

Referring to FIG. 3, the support structure lobes 92 are interspersed with the flange fastener apertures 76 circumferentially about the rotational axis 34. For example, each of the support structure lobes 92 is arranged (e.g., aligned) circumferentially between a circumferentially neighboring (e.g., adjacent) pair of the flange fastener apertures 76. Similarly, each of the flange fastener apertures 76 is arranged (e.g., aligned) circumferentially between a circumferentially neighboring (e.g., adjacent) pair of the support structure lobes 92. Each flange fastener apertures 76 may thereby be located partially (or completely) in a groove 122 formed in the support structure 52 between the respective circumferentially neighboring pair of the support structure lobes 92. Each groove 122 projects radially into the support structure 52 to the concave element 102, 104 and/or the support structure base 90. Each groove 122 extends axially through the support structure 52 (e.g., to the flange 51); see also FIGS. 2 and 4.

Referring to FIG. 4, with the foregoing configuration, each of the support structure lobes 92 may project radially between and, thus, radially overlap one or both of its circumferentially neighboring flange fastener apertures 76. A radial distance 124 from the rotational axis 34 to (e.g., an apex of) the distal outer end 94 (e.g., tip) of a respective support structure lobe 92, for example, may be sized greater than a radial distance 126 from the rotational axis 34 to (e.g., a point closest to the rotational axis 34 on) the respective flange fastener aperture 76. However, the radial distance 124 may be sized less than a radial distance 128 from the rotational axis 34 to (e.g., a point farthest away from the rotational axis 34 on) the respective flange fastener aperture 76. For example, the radial distance 124 may be equal to (or slightly different than) the radial distance 82 (see FIG. 3) from the rotational axis 34 to the centerline 80 of the respective flange fastener aperture 76. The present disclosure, however, is not limited to the foregoing exemplary dimensional relationships.

Referring to FIG. 1, the rotor 22 is mated with the shaft 24. A rim 130 (or other projection) of the shaft 24 at the base first end 54, for example, may project into the hub bore 46. The hub second side 40 may be abutted axially against the flange first side 72. Each of the fasteners 26 may be mated with a respective one of the flange fastener apertures 76 and a respective one of the hub fastener apertures 48. The rotor hub 36 and the shaft flange 51 are secured together by the fasteners 26. The rotor hub 36 and the shaft flange 51 of FIG. 1, for example, are clamped axially together between heads of the bolts 28 and the nuts 32.

During operation of the rotating structure 20, vibrations or other loads may generate a bending moment between the rotor 22 and the shaft 24. The support structure 52 and its support structure lobes 92, however, may increase shaft resist such a bending moment. The support structure 52 and its support structure lobes 92 of FIGS. 2 and 3, for example, reinforce the connection between the shaft flange 51 and the shaft base 50. For example, each support structure lobe 92 may function as a gusset between the shaft flange 51 and the shaft base 50. The support structure 52 and its support structure lobes 92 also distribute loads across a larger area between the shaft flange 51 and the shaft base 50. The support structure 52 and its support structure lobes 92 may thereby prevent or limit bending between the shaft flange 51 and the shaft base 50. Providing the support structure lobes 92 may also facilitate provision of a smaller pattern for the fasteners 26 (see FIG. 1) since each lobe 92 may project between circumferentially neighboring fasteners 26. By contrast, if a full circular fillet between a shaft base and a shaft flange were increased in size, mounting fasteners would need to be moved radially outward to prevent interference between the fillet and the mounting fasteners.

In some embodiments, referring to FIG. 2, the shaft 24 may include a plurality of spline teeth 132; e.g., ribs. These spline teeth 132 are arranged circumferentially about the rotational axis 34 at the base outer side 60 in an annular array. The spline teeth 132 are arranged at (e.g., on, adjacent or proximate) the base second end 56. These spline teeth 132 may mate with spline teeth on another component (e.g., another shaft, a gear, etc.), thereby providing a splined connection therebetween.

Figure 6:
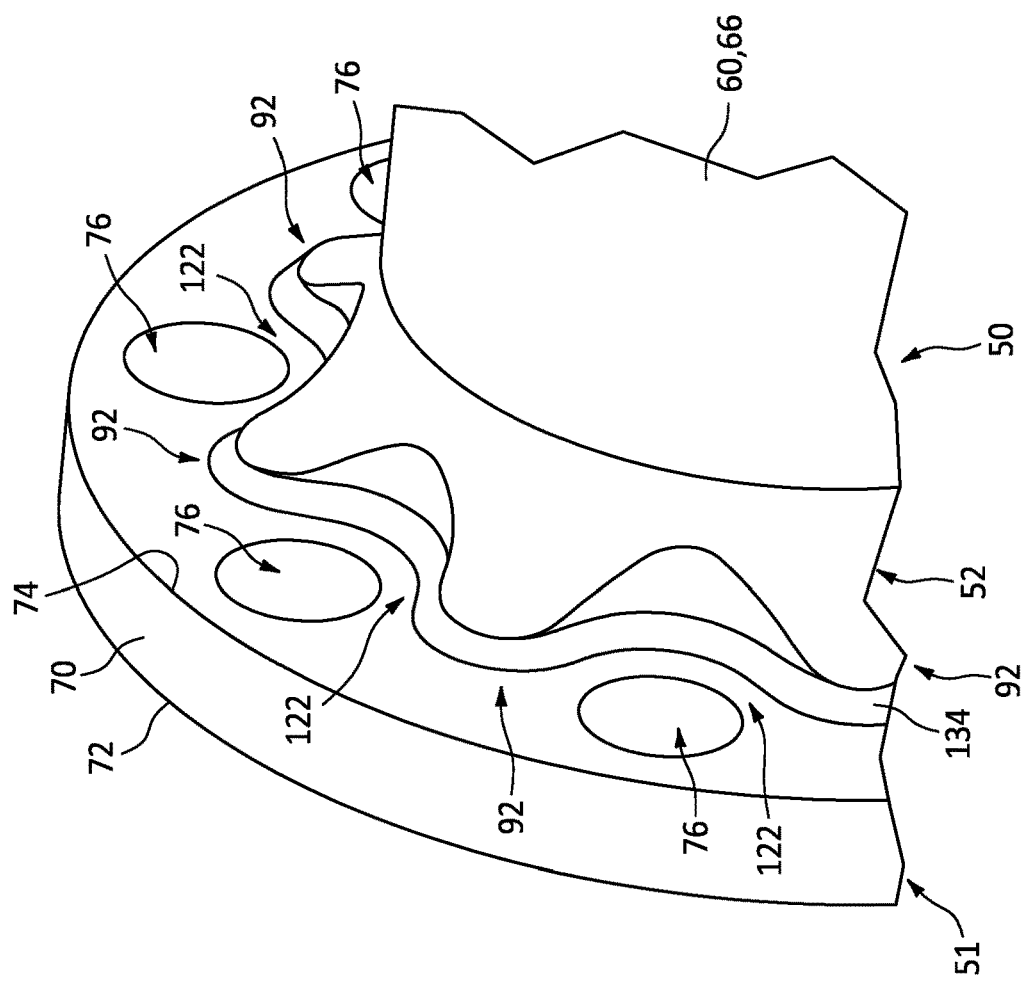
FIG. 6 is a perspective illustration of a portion of the shaft of FIG. 2.

In some embodiments, referring to FIG. 6, a fillet 134 may provide a transition at a corner between the support structure 52 and its lobes 92 and the shaft flange 51.

Figure 7:
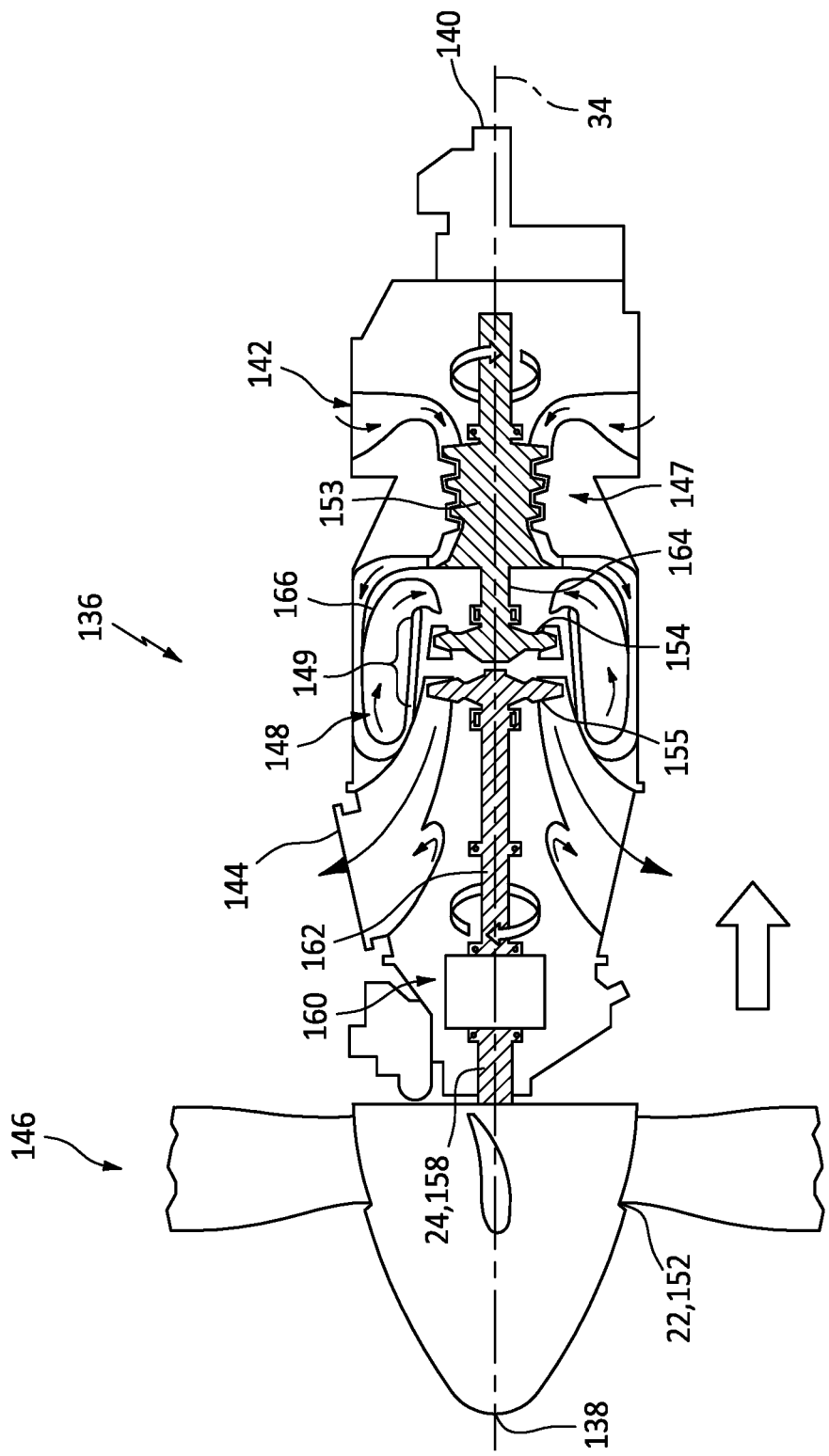
FIG. 7 is a schematic illustration of a gas turbine engine with which the rotating structure may be included.

FIG. 7 illustrates an example of the gas turbine engine with which the rotating structure 20 may be configured. This gas turbine engine is configured as a turboprop gas turbine engine 136. This gas turbine engine 136 of FIG. 7 extends axially along the rotational axis 34 between a forward end 138 of the gas turbine engine 136 and an aft end 140 of the gas turbine engine 136. The gas turbine engine 136 of FIG. 7 includes an airflow inlet 142, an exhaust 144, a propulsor (e.g., a propeller) section 146, a compressor section 147, a combustion section 148 and a turbine section 149.

The airflow inlet 142 is towards the engine aft end 140, and aft of the gas turbine engine sections 146-149. The exhaust 144 is located towards the engine forward end 138, and axially between the propulsor section 146 and the gas turbine engine sections 147-149.

The propulsor section 146 includes a propulsor rotor 152; e.g., the rotor 22. The compressor section 147 includes a compressor rotor 153. The turbine section 149 includes a high pressure turbine (HPT) rotor 154 and a low pressure turbine (LPT) rotor 155, where the LPT rotor 155 may be referred to as a power turbine rotor and/or a free turbine rotor. Each of these gas turbine engine rotors 152-155 includes a plurality of rotor blades arranged circumferentially about and connected to one or more respective rotor disks or hubs.

The propulsor rotor 152 of FIG. 7 is connected to the LPT rotor 155 sequentially through a propulsor shaft 158 (e.g., the shaft 24), an epicyclic geartrain 160 and a low speed shaft 162. The compressor rotor 153 is connected to the HPT rotor 154 through a high speed shaft 164.

During gas turbine engine operation, air enters the gas turbine engine 136 through the airflow inlet 142. This air is directed into a core flowpath which extends sequentially from the airflow inlet 142, through the engine sections 147-149 (e.g., an engine core), to the exhaust 144. The air within this core flowpath may be referred to as "core air".

The core air is compressed by the compressor rotor 153 and directed into a combustion chamber of a combustor 166 in the combustion section 148. Fuel is injected into the combustion chamber and mixed with the compressed core air to provide a fuel-air mixture. This fuel-air mixture is ignited and combustion products thereof flow through and sequentially cause the HPT rotor 154 and the LPT rotor 155 to rotate. The rotation of the HPT rotor 154 drives rotation of the compressor rotor 153 and, thus, compression of air received from the airflow inlet 142. The rotation of the LPT rotor 155 drives rotation of the propulsor rotor 152, which propels air outside of the gas turbine engine 136 in an aft direction to provide forward aircraft thrust.

The rotating structure 20 may be included in various gas turbine engines other than the ones described above. The rotating structure 20, for example, may be included in a geared gas turbine engine where a gear train connects one or more shafts to one or more rotors in a fan section, a compressor section and/or any other engine section. Alternatively, the rotating structure 20 may be included in a gas turbine engine configured without a gear train; e.g., a direct drive gas turbine engine. The gas turbine engine may be configured with a single spool, with two spools, or with more than two spools. The gas turbine engine may be configured as a turbofan engine, a turbojet engine, a turboprop engine, a turboshaft engine, a propfan engine, a pusher fan engine, an auxiliary power unit (APU) or any other type of gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
a shaft base extending axially along an axis between a shaft first end and a shaft second end;
a flange connected to the shaft base at the shaft first end, the flange projecting radially out from the shaft base, the flange comprising a plurality of fastener apertures, and the plurality of fastener apertures comprising a first fastener aperture; and
a flange support structure including
a support structure base circumscribing and connected to the shaft base; and
a plurality of lobes arranged circumferentially about the axis and the support structure base, each of the plurality of lobes connected to and projecting radially out from the support structure base, each of the plurality of lobes connected to and projecting axially out from the flange, and the plurality of lobes including a first lobe and a second lobe;
the first fastener aperture arranged circumferentially between the first lobe and the second lobe, and the second lobe radially overlapping the first fastener aperture;
the flange support structure projects radially out from a cylindrical outer surface of the shaft base to the plurality of lobes;
a convex portion of the flange support structure at a tip of the first lobe having a first radius of curvature;
a concave portion of the flange support structure between the first lobe and the second lobe having a second radius of curvature; and
a ratio of the first radius of curvature to the second radius of curvature between 0.2 and 2.5.

2. The apparatus of claim 1, wherein the shaft base is configured as a tubular shaft base.

3. The apparatus of claim 1, wherein the first fastener aperture extends axially through the flange.

4. The apparatus of claim 1, wherein the first lobe radially overlaps the first fastener aperture.

5. The apparatus of claim 1, wherein
the plurality of lobes further include a third lobe; and
the plurality of fastener apertures further include a second fastener aperture arranged circumferentially between the second lobe and the third lobe.

6. The apparatus of claim 5, wherein the second lobe radially overlaps the second fastener aperture.

7. The apparatus of claim 1, wherein
the plurality of lobes further include a third lobe and a fourth lobe;
the plurality of fastener apertures further include a second fastener aperture arranged circumferentially between the third lobe and the fourth lobe; and
the third lobe radially overlaps the second fastener aperture.

8. The apparatus of claim 1, wherein the first lobe circumferentially tapers as the first lobe projects radially away from the shaft base towards a distal end of the first lobe.

9. The apparatus of claim 1, wherein the first lobe axially tapers as the first lobe projects radially out from the support structure base towards a distal end of the first lobe.

10. The apparatus of claim 1, further comprising a fillet at a corner between the first lobe and the flange.

11. The apparatus of claim 1, wherein
tips of the plurality of lobes define an outer peripheral circumference of the flange support structure; and
a diameter of the outer peripheral circumference of the flange support structure is between 1.05 times and two times a diameter of the cylindrical outer surface.

12. The apparatus of claim 1, further comprising:
a plurality of fasteners mated with the plurality of fastener apertures; and
a rotor for the gas turbine engine mounted to the flange by the plurality of fasteners.

13. The apparatus of claim 12, wherein
the rotor comprises a propeller; and
the gas turbine engine comprises a turboprop engine.

14. An apparatus for a gas turbine engine, comprising:
a shaft base extending axially along an axis;
a flange connected to and projecting radially out from the shaft base; and
a flange support structure connected to and between the shaft base and the flange, the flange support structure radially tapering to the shaft base as the flange support structure projects axially away from the flange to a distal end of the flange support structure, the flange support structure comprising an outer peripheral boundary at the flange when viewed in a plane perpendicular to the axis, and the outer peripheral boundary includes a plurality of concave sections and a plurality of convex sections interspersed with the plurality of concave sections;
the flange support structure including a support structure base and a plurality of lobes;
the support structure base extending completely around the shaft base, and the support structure base projecting axially out from the flange to the distal end of the flange support structure;
the plurality of lobes arranged circumferentially about the support structure base, and a first of the plurality of lobes projecting radially out from the support structure base to a first of the plurality of convex sections; and the first of the plurality of convex sections having a first radius of curvature, a first of the plurality of concave sections between the first of the plurality of convex sections and a second of the plurality of convex sections having a second radius of curvature, and a ratio of the first radius of curvature to the second radius of curvature between 0.2 and 2.5.

15. The apparatus of claim 14, wherein the flange support structure forms a plurality of grooves arranged circumferentially about the axis; and a first of the plurality of grooves projects radially into the flange support structure to a to the first of the plurality of concave sections.

16. The apparatus of claim 14, wherein the flange includes a plurality of fastener apertures; and a first of the plurality of fastener apertures is arranged circumferentially between a circumferentially neighborhood pair of the plurality of convex sections.

\* \* \* \* \*